US00RE40652E

(19) United States
(12) Reissued Patent
Nishimura

(10) Patent Number: US RE40,652 E
(45) Date of Reissued Patent: Mar. 10, 2009

(54) JIG FOR POSITIONING AND FIXING WORKPIECE

(76) Inventor: Eikichi Nishimura, 5-19, Toshin-cho, Seki-Shi , Gifu 501-3824 (JP)

(21) Appl. No.: 11/294,701

(22) Filed: Dec. 5, 2005

Related U.S. Patent Documents

Reissue of:
(64) Patent No.: 6,715,747
Issued: Apr. 6, 2004
Appl. No.: 10/268,845
Filed: Oct. 10, 2002

U.S. Applications:
(63) Continuation of application No. PCT/JP01/03118, filed on Apr. 11, 2001.

(30) Foreign Application Priority Data

Apr. 12, 2000 (JP) ..... 2000-111244

(51) Int. Cl.
*B66F 3/08* (2006.01)

(52) U.S. Cl. ..... 269/91; 269/93

(58) Field of Classification Search ..... 269/91, 269/93, 94, 100, 99, 60, 246
See application file for complete search history.

(56) References Cited

FOREIGN PATENT DOCUMENTS

| | | | | |
|---|---|---|---|---|
| JP | 62-65136 | U | * | 4/1987 |
| JP | 1-92337 | U | * | 6/1989 |
| JP | 01-199744 | A | * | 8/1989 |
| JP | 01199744 | A | * | 8/1989 |
| JP | 4-2541 | U | * | 1/1992 |
| JP | 04189438 | A | * | 7/1992 |
| JP | 04-189438 | A | * | 7/1992 |
| JP | 10231091 | A | * | 9/1998 |
| JP | 10-231091 | A | * | 9/1998 |
| JP | 11-207641 | A | * | 8/1999 |
| JP | 11207641 | A | * | 8/1999 |

* cited by examiner

*Primary Examiner*—Hadi Shakeri
(74) *Attorney, Agent, or Firm*—David W. Carstens; Carstens & Cahoon, LLP

(57) ABSTRACT

A fixing member (B, N) pierces a screw hole (13b) of a first clamping member (13) and an insertion hole (14c) of a second clamping member (14), and fixes the first and second clamping members (13, 14) to a workbench (12). The position of a workpiece (W) relative to the workbench is determined by utilizing the first and second clamping members (13, 14) fixed to the workbench (12) by the fixing member (B, N). The workpiece (W) moved to a space between a clamping face (13d) of the first clamping member (13) and a flange portion (14b) of the second clamping member (14) is fixed by a fastening member (15).

13 Claims, 9 Drawing Sheets

JIG FOR POSITIONING AND FIXING WORKPIECE

Matter enclosed in heavy brackets [ ] appears in the original patent but forms no part of this reissue specification; matter printed in italics indicates the additions made by reissue.

*This application is a continuation of PCT application Ser. No. PCT/JP01/03118, filed Apr. 11, 2001.*

BACKGROUND OF THE INVENTION

The present invention relates to a jig for positioning and fixing a workpiece, and more particularly to a jig which can position a workpiece with respect to a workbench of a machine tool such as a pressing machine or a cutting machine and clamp the workpiece.

As a jig for positioning and fixing a workpiece, the applicant of this application proposes one disclosed in Japanese Laid-Open Patent Publication No. Hei 10-231091. As shown in FIG. 9, this jig includes a base member 32 mounted on the upper face of a table 31, and an adjustment member 33 screwed into a screw hole 32a of the base member 32. Further this jig includes a bolt 34 and a first nut 35. The bolt 34 is inserted into the screw hole 32a of the base member 32 and a through hole 33b formed in the center of the adjustment member 33. The bolt 34 is engaged and fixed to the table 31. The first nut 35 fixes the base member 32 and the adjustment member 33 to the table 31 in cooperation with the bolt 34.

When fixing a workpiece W, a clamp fitting 36 is mounted on a flange portion 33c integrally formed at the upper end portion of the adjustment member 33 and the workpiece W mounted on the upper face of the table 31. Then, a second nut 37 screwed into the bolt 34 is fastened and the clamp fitting 36 is pressed downward, thereby fixing the workpiece W to the table 31.

In the conventional jig, however, a space formed between the upper end face 32b of the base member 32 and the lower end face 33e of the flange portion 33c is not effectively utilized. Therefore, the clamp fitting 36 must be arranged as a separate member on the upper face of the flange portion 33c of the adjustment member 33, and the number of components of the jig is thereby increased, which results in the problem that manufacturing and assembling cannot readily be performed.

It is an objective of the present invention to eliminate the problem existing in the prior art and to provide a jig for positioning and fixing a workpiece, which can facilitate manufacture with the reduced number of components and easily perform the clamping operation.

BRIEF SUMMARY OF THE INVENTION

To solve the above-described problem, according to the present invention, there is provided a jig for positioning and fixing a workpiece on a workbench. The jig has a first clamping member having a screw hole extending in the vertical direction. A second clamping member has an insertion hole extending in the vertical direction, also has a male screw portion screwed into the screw hole of the first clamping member so as to be capable of adjusting a position thereof. The second clamping member also includes a flange portion at the upper outer periphery. A fixing member pierces the screw hole of the first clamping member and the insertion hole of the second clamping member, and fixes the first and second clamping members to the workbench. A fastening member determines the position of a workpiece with respect to the workbench by utilizing the first and second clamping members fixed to the workbench by the fixing member, and fixes the workpiece which has moved to a space between the clamping face of the first clamping member and the flange portion of the second clamping member.

DETAILED DESCRIPTION OF THE PREFERRED EMBODIMENTS

Figure 1:
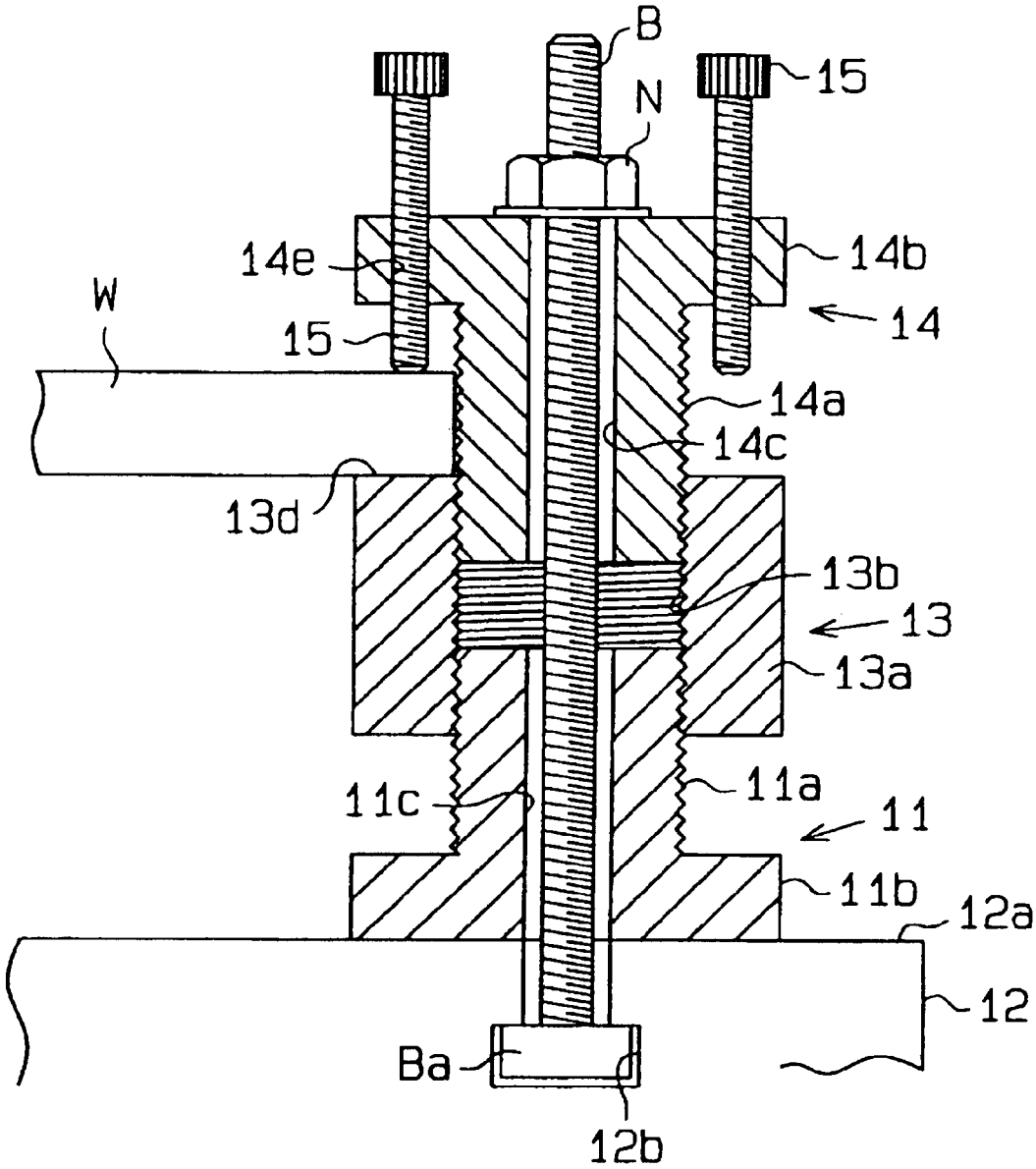
FIG. 1 is a vertical cross-sectional view showing a first embodiment according to the present invention.
Figure 2:
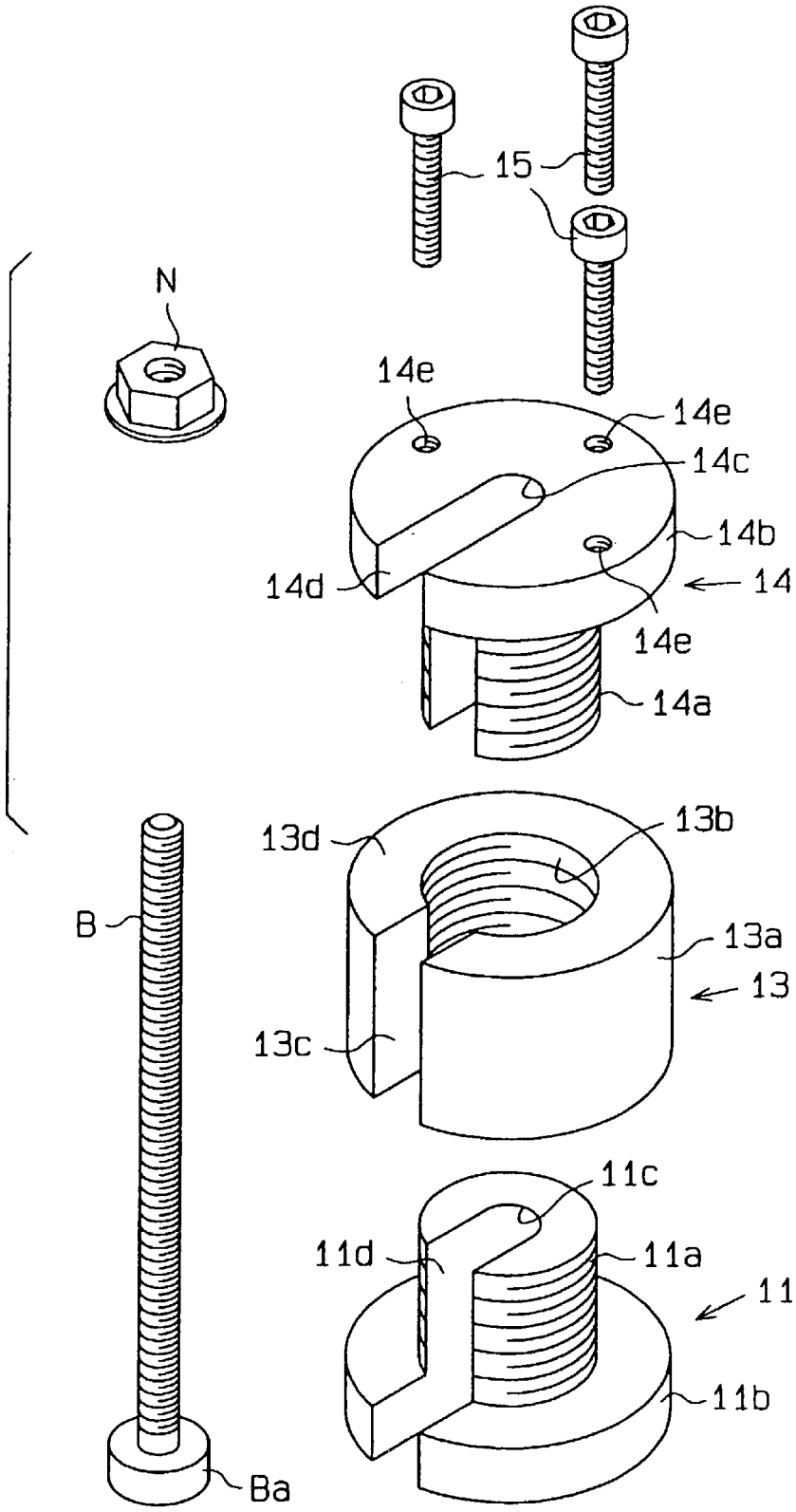
FIG. 2 is an exploded perspective view of a base member, a first clamping member and a second clamping member.

A jig for positioning and fixing a workpiece in a first embodiment according to the present invention will now be described hereinafter with reference to FIGS. 1 and 2.

The jig according to this embodiment includes a base member 11, a first clamping member 13 and a second clamping member 14. The base member 11 is mounted on a workbench of a machine tool, namely, an upper face 12a of table 12. A male screw portion 11a is formed on the outer peripheral face of the base member 11, and a flange portion 11b used for stabilizing the support state on the upper face of the table 12 is integrally formed at the outer peripheral portion at the lower end of the same. Moreover, an insertion hole 11c for a fixing bolt B is formed in the center portion of the same so as to penetrate in the vertical direction. A passage 11d (see FIG. 2) for inserting and removing the fixing bolt B from the side portion is notched and formed at the male screw portion 11a and the flange portion 11b in accordance with the insertion hole 11c of the bolt B.

The first clamping member 13 includes a cylindrical main body 13a having a cylindrical shape. A screw hole 13b is formed in the center portion of the cylindrical main body 13a. A passage 13c along which the fixing bolt B is inserted or removed is notched and formed at the one side portion of the screw hole 13b. The upper end face of the first clamping member 13 functions as a clamping face 13d used for clamping a workpiece W. The first clamping member 13 is screwed into the male screw portion 11a of the base member 11 and can adjust the position of the clamping face 13d in the vertical direction.

The second clamping member 14 is screwed into the upper part of the screw hole 13b of the first clamping member 13. The second clamping member 14 has a male screw portion 14a and a flange portion 14b integrally formed in the outer peripheral portion at the upper end thereof. An insertion hole 14c extending in the vertical direction is formed in the center portions of the male screw portion 14a and the flange portion 14b, and the fixing bolt B is inserted into the insertion hole 14c. A passage 14d along which the fixing bolt B is inserted or removed is formed at the male screw portion 14a and the flange portion 14b. A plurality of screw holes 14e extending in the vertical direction are formed in the flange portion 14b, and a clamping bolt 15 as a fastening member is screwed into each screw hole 14e.

An engagement groove 12b is formed on the table 12. A head portion Ba is integrally formed in the lower end portion of the fixing bolt B. In addition, the shaft portion of the fixing bolt B extends upwards from the engagement groove 12b with the head portion Ba of the fixing bolt B engaged with the engagement groove 12b. The fixing bolt B also protrudes above the second clamping member 14 through the insertion hole 11c of the base member 11, the screw hole 13b of the first clamping member 13 and the insertion hole 14c of the second clamping member 14. A nut N is screwed in the vicinity of the upper end of the shaft portion of the fixing bolt B. The base member 11, the first clamping member 13 and the second clamping member 14 are fastened and fixed to the upper face 12a of the table 12 with the fixing bolt B and the nut N. The fixing bolt B and the nut N constitute the fixing member.

A clamping bolt 15 screwed into each screw hole 14e of the second clamping member 14 is designed to be fixed to the clamping face 13d and the workpiece W supported on the clamping face 13d of the first clamping member 13.

Description will now be given of the advantages, the structure and the effects of the jig having the above-described structure.

(1) In the first embodiment, the clamping face 13d is formed on the upper end face of the first clamping member 13. The workpiece W is moved to a space between the first and second clamping members 13 and 14. The lower face of the workpiece W is supported on the clamping face 13d. In this state, the workpiece W is fixed by the clamping bolt 15 screwed into each screw hole 14e of the flange portion 14b. Therefore, after the height of the workpiece W is adjusted by utilizing the clamping face 13d of the first clamping member 13 and the flange portion 14b of the second clamping member 14, the workpiece W can be clamped and fixed to a desired height by using each clamping bolt 15.

Further, in the first embodiment, since the clamping face 13d of the first clamping member 13 is used as the clamping face of the workpiece W, the manufacturing and assembling operations can be facilitated with the reduced number of components.

(2) In the first embodiment, the passages 11d, 13c and 14d along which the fixing bolt B is inserted or removed from the side portion are formed in the base member 11, the first clamping member 13 and the second clamping member 14. It is, therefore, possible to facilitate the operation for attaching the base member 11, the first clamping member 13 and the second clamping member 14 to the table 12.

(3) In the first embodiment, the height of the workpiece W from the table 12 can be set to a desired height by adjusting the amount of screwing the first clamping member 13 relative to the male screw portion 11a of the base member 11 and an amount of screwing the male screw portion 14a of the second clamping member 14 with respect to the first clamping member 13.

(4) In the first embodiment, the workpiece W is fixed to the jig by pressing the workpiece W supported onto the clamping face 13d of the first clamping member 13 against the clamping face 13d by the clamping bolt 15. Therefore, the fastening force obtained by the clamping bolt 15 can be all utilized as the clamping force of the workpiece W, thereby stably holding the workpiece W at a predetermined position.

It is to be noted that the jig for positioning and fixing the workpiece can be embodied by making changes as follows.

Figure 3:
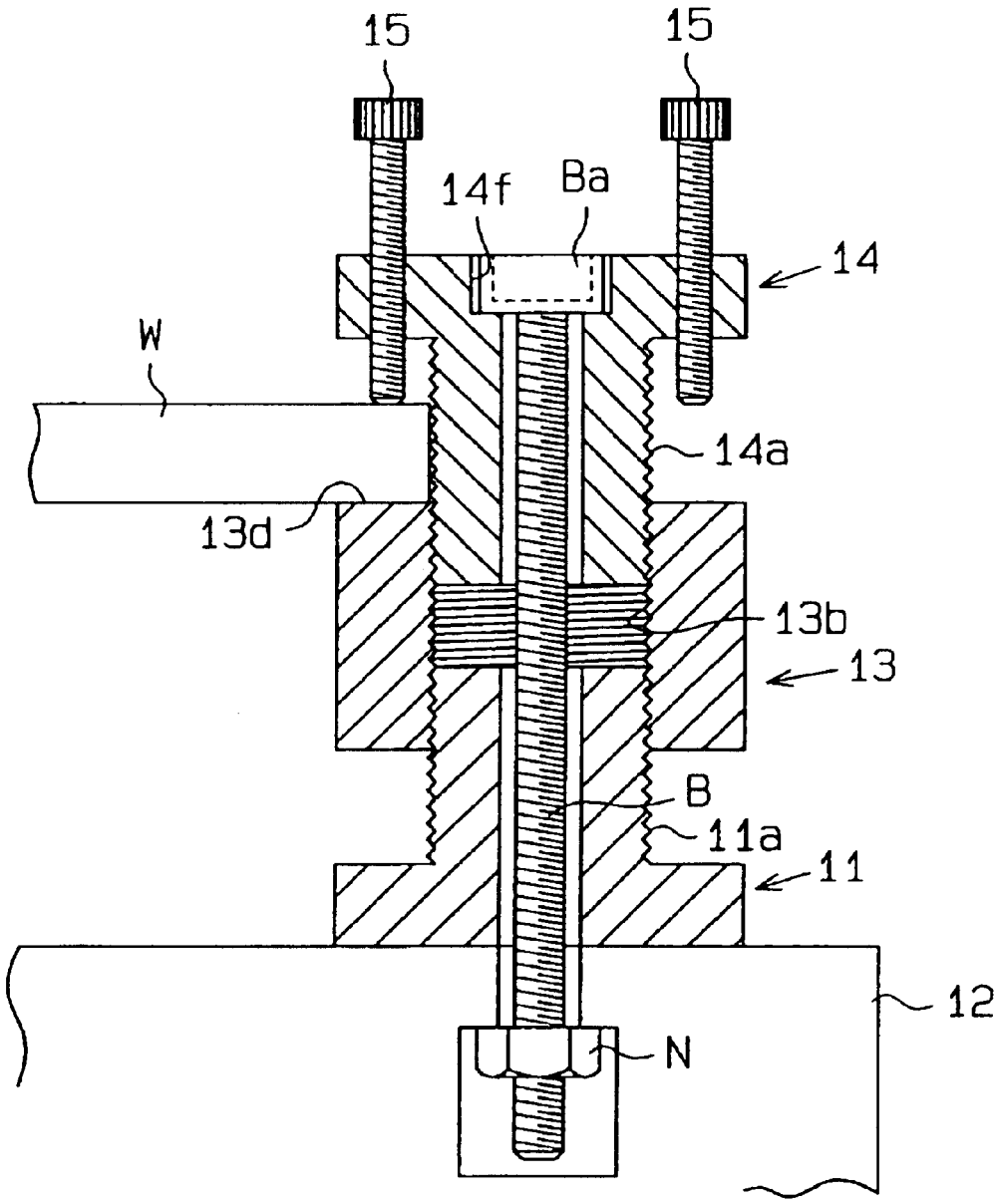
FIG. 3 is a vertical cross-sectional view showing a second embodiment according to the present invention.

In a second embodiment illustrated in FIG. 3, a concave portion 14f is formed in the upper end face of the second clamping member 14 concentrically with the insertion hole 14c. The head portion Ba of the fixing bolt B may be accommodated in the concave portion 14f. In this case, the nut N is fixed in the groove 12b. In the second embodiment, a tool for operating to turn the clamping bolt 15 does not interfere with the fixing bolt B and the nut N. The operation for turning the clamping bolt 15 can be performed easily, and the interference with the tool of the machine tool can be reduced.

Figure 4:
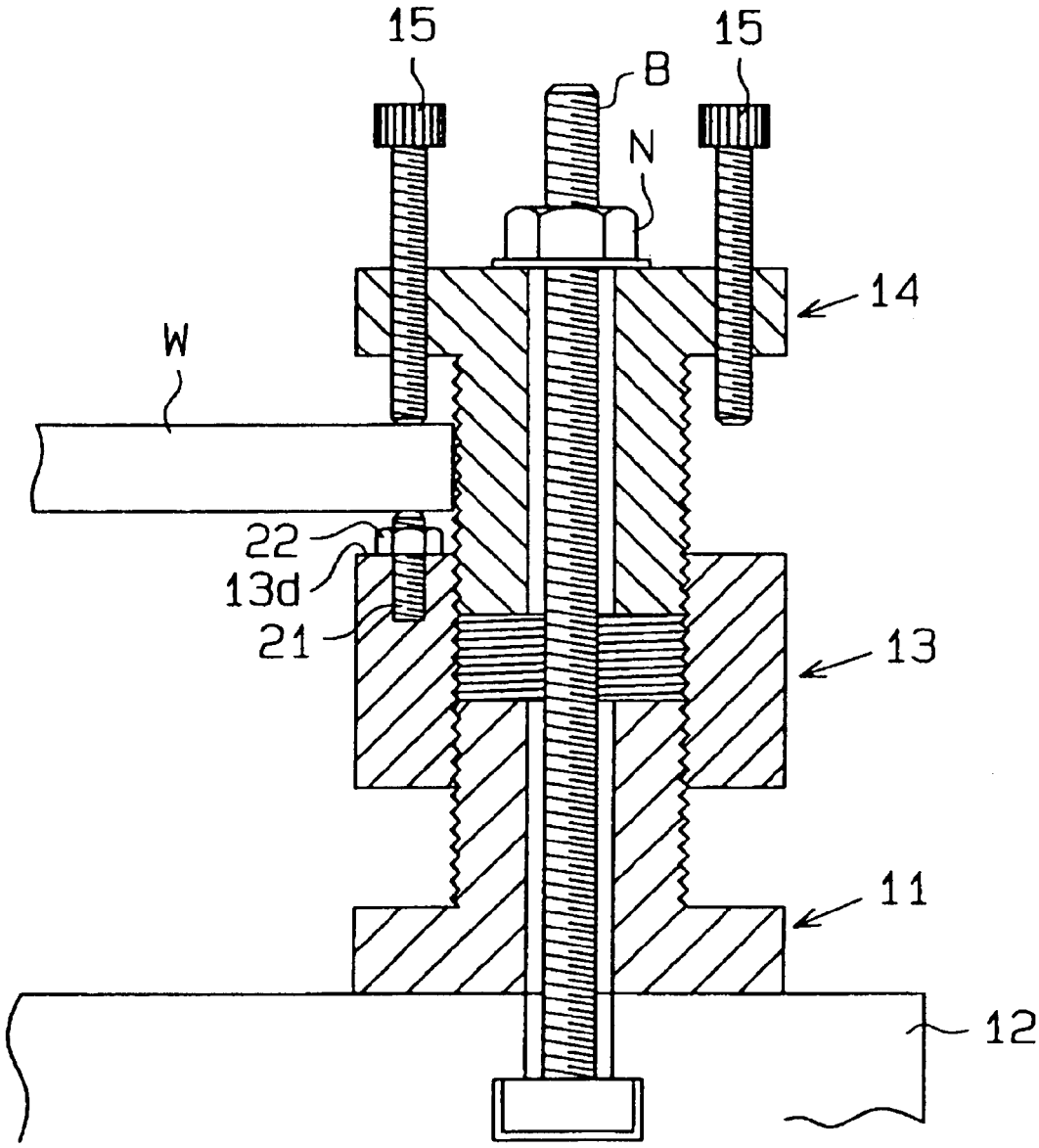
FIG. 4 is a vertical cross-sectional view showing a third embodiment according to the present invention.

In a third embodiment shown in FIG. 4, a height adjustment bolt 21 is screwed into the clamping face 13d of the first clamping member 13 so as to be capable of adjusting a position, and fixed by a nut 22. In this embodiment, therefore, a height of the workpiece W can be readily finely adjusted by adjusting a protruding height of the height adjustment bolt 21 from the clamping face 13d.

Figure 5:
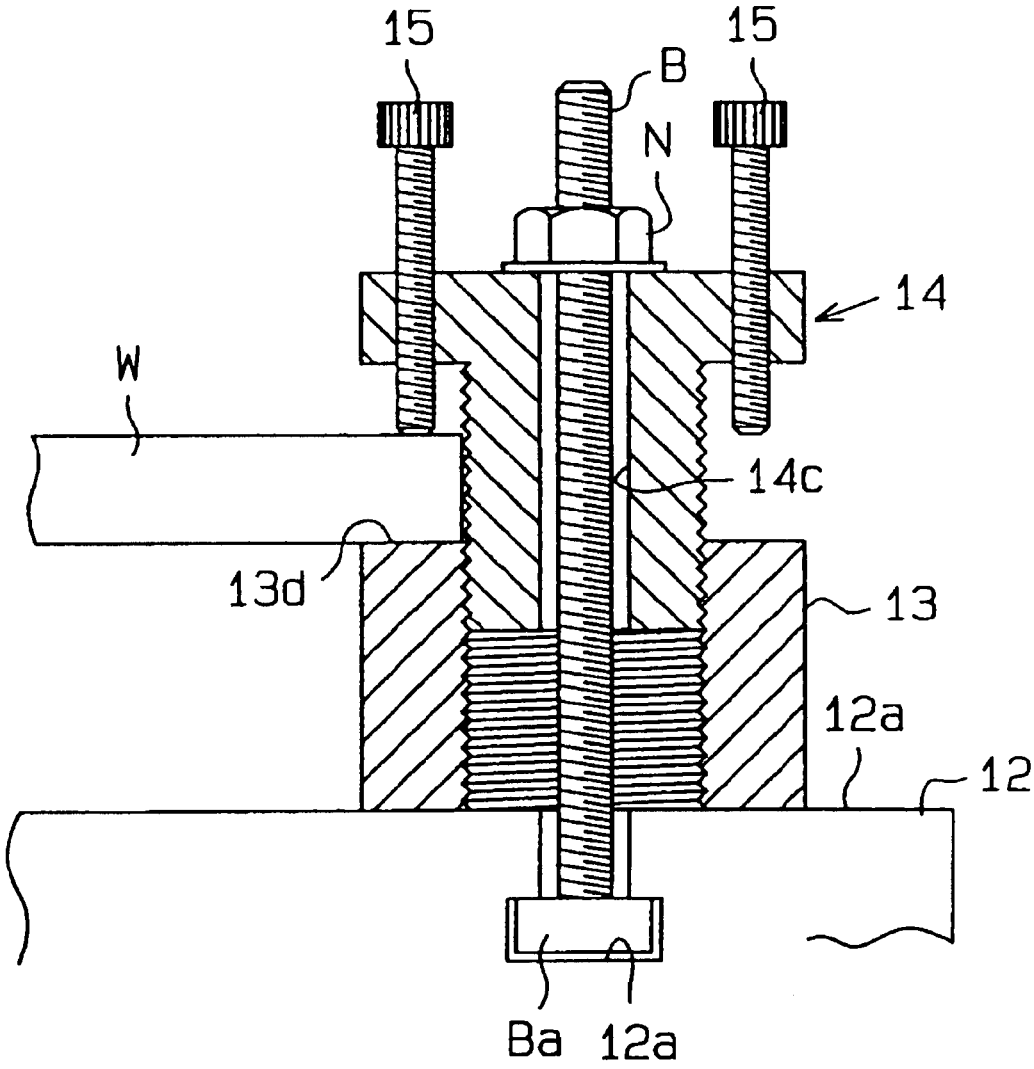
FIG. 5 is a vertical cross-sectional view showing a fourth embodiment according to the present invention.

In a fourth embodiment shown in FIG. 5, the base member 11 is omitted, and the first clamping member 13 is directly in contact with the upper face 12a of the table 12. In this case, the number of components can be further reduced.

Figure 6:
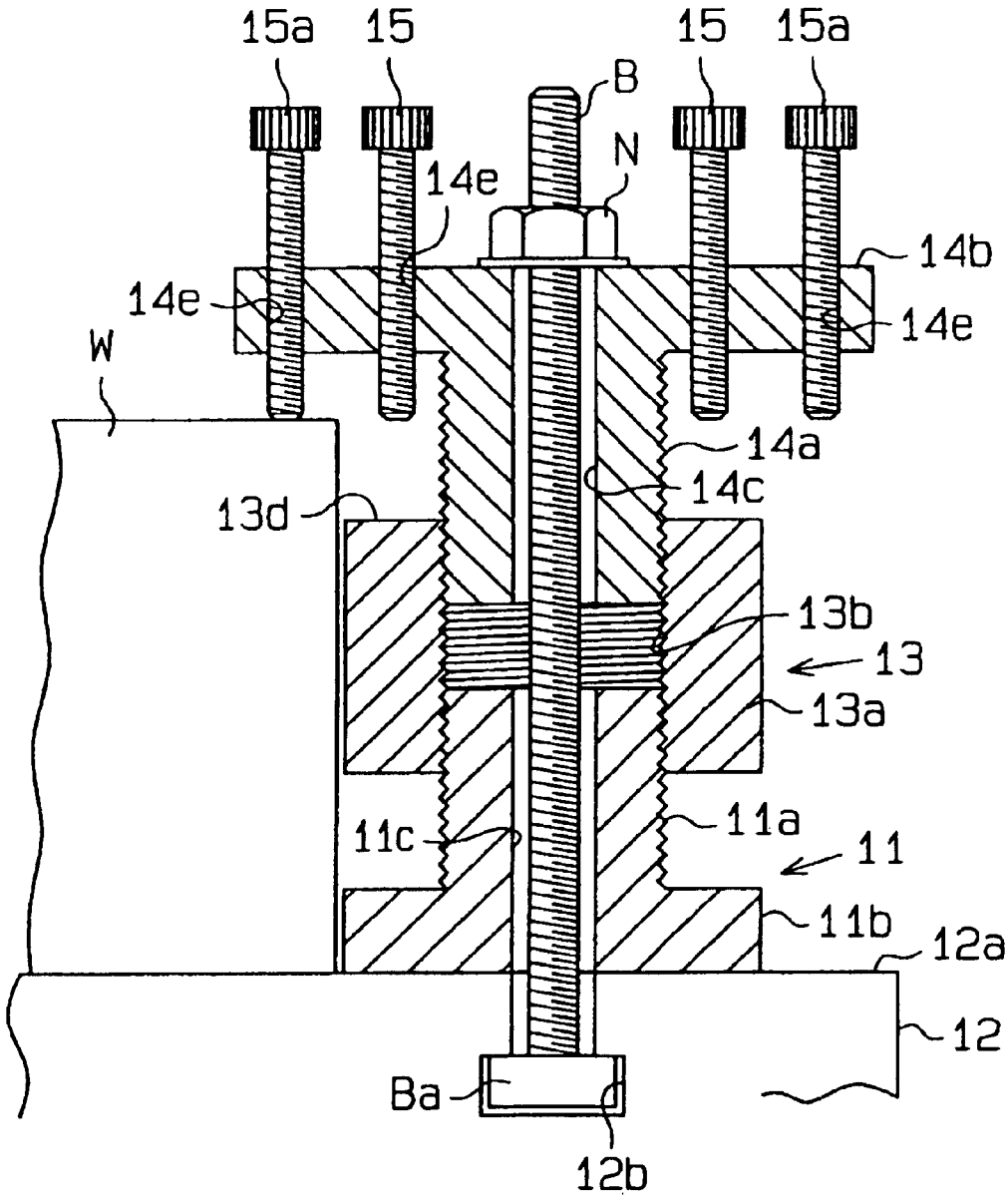
FIG. 6 is a vertical cross-sectional view showing a fifth embodiment according to the present invention.

In a fifth embodiment shown in FIG. 6, the flange portion 14b of the second clamping member 14 protrudes in the side direction away from the outer peripheral face of the first clamping member 13. A clamping bolt 15a for clamping and fixing the upper end face of the workpiece W supported on the table 12 is provided at the protruding portion of the flange portion 14b. It is, therefore, possible to carry out fixation of the workpiece W on the table 12 by using the clamping bolt 15a as well as fixation of the workpiece W to the clamping face 13d by using the clamping bolt 15.

Figure 7:
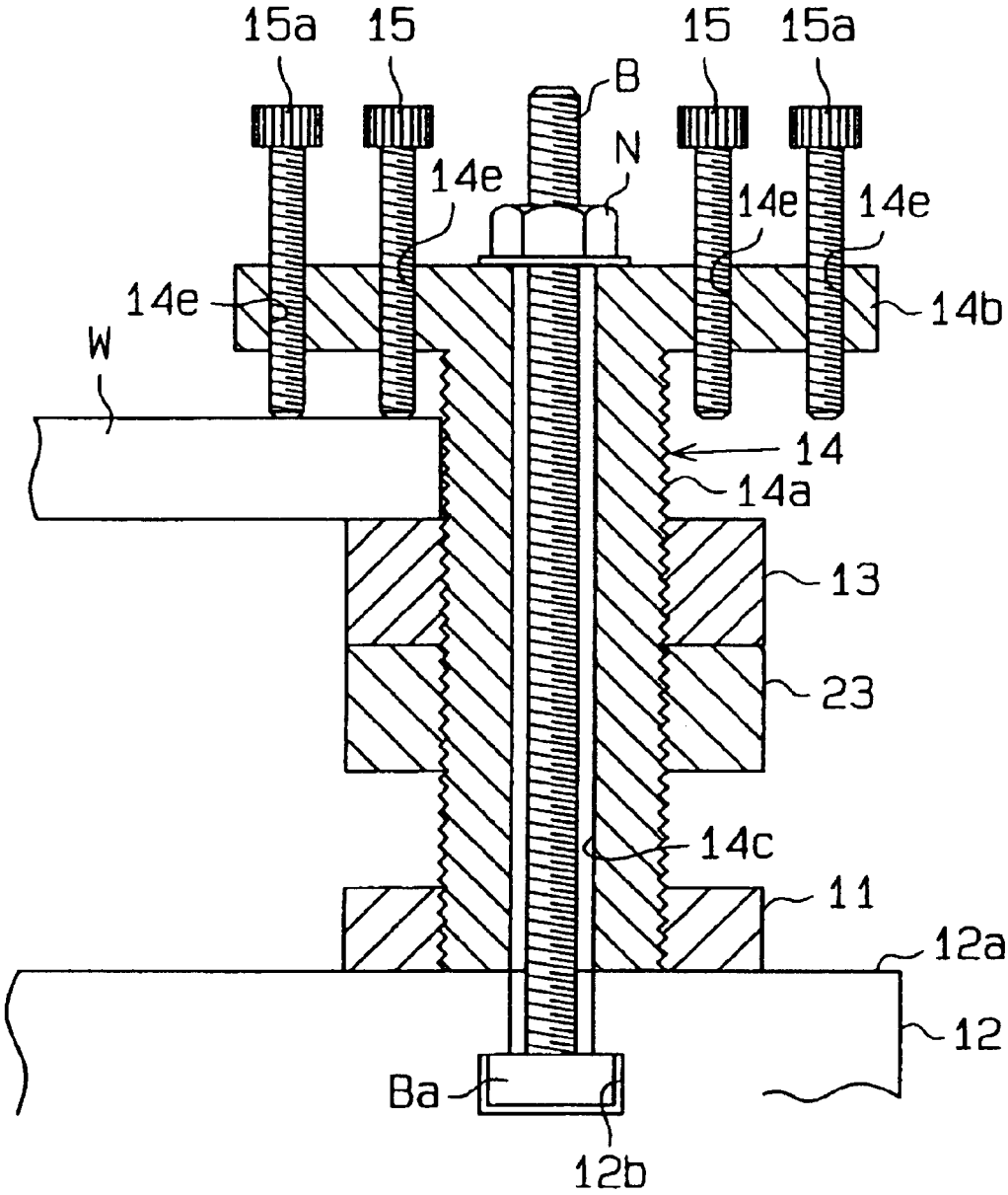
FIG. 7 is a vertical cross-sectional view showing a sixth embodiment according to the present invention.

In a sixth embodiment shown in FIG. 7, the lower end face of the male screw portion 14a of the second clamping member 14 is supported on the upper face of the table 12, and the first clamping member 13 is screwed into the intermediate portion of the male screw portion 14a so as to be capable of adjusting a position in the vertical direction. A nut 23 for setting the first clamping member 13 to a predetermined height position is screwed into the male screw portion 14a. The base member 11 supported on the upper face of the table 12 is screwed into the lower end portion of the male screw portion 14a of the second clamping member 14. This base member 11 may be omitted.

Figure 8:
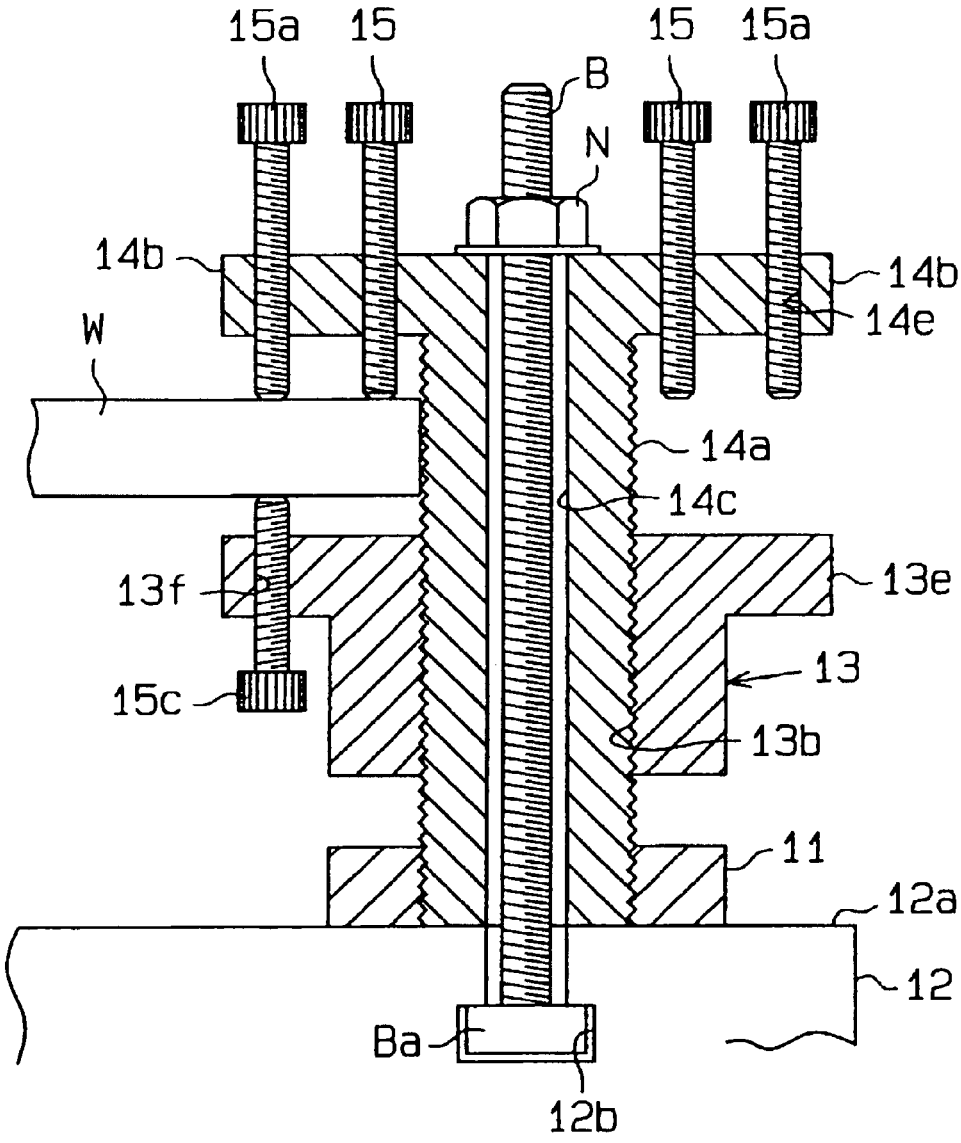
FIG. 8 is a vertical cross-sectional view showing a seventh embodiment according to the present invention.
Figure 9:
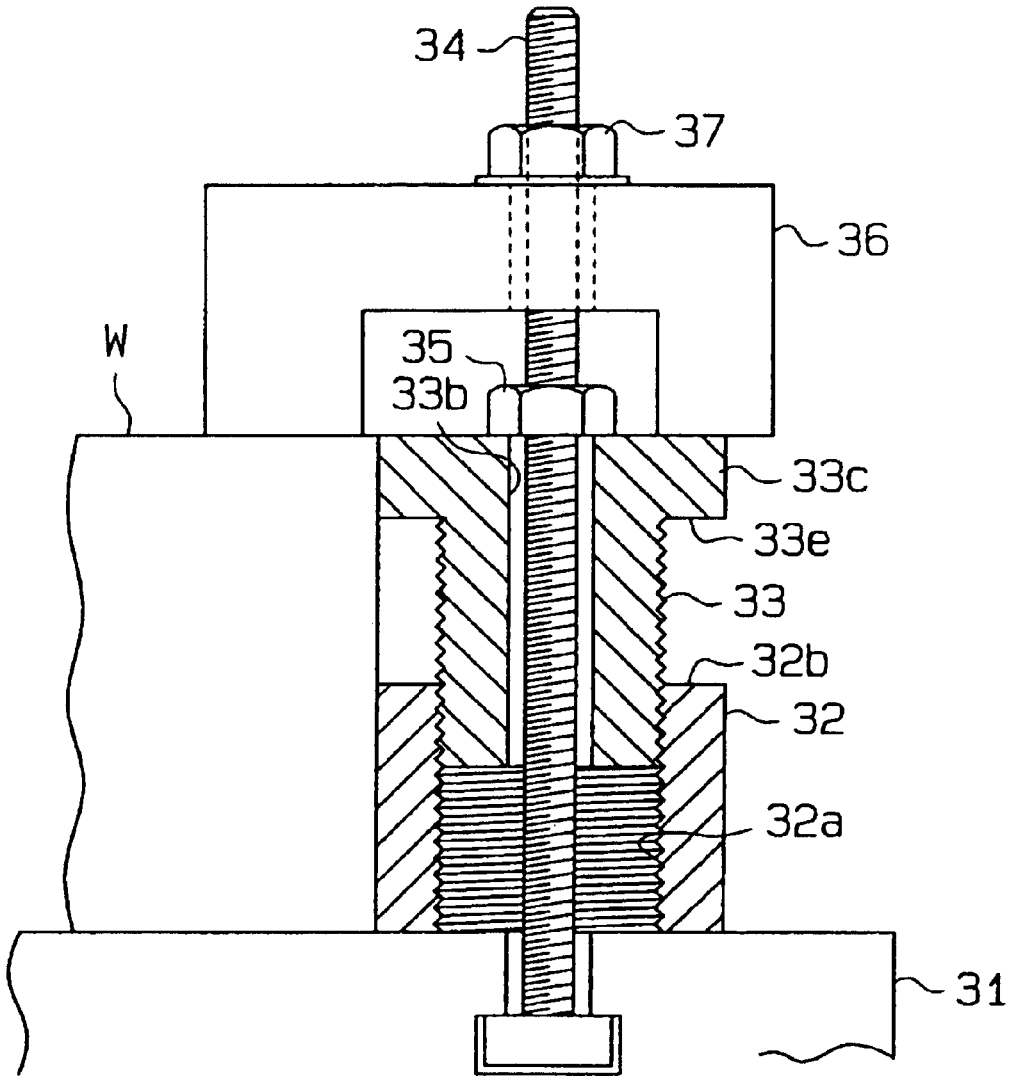
FIG. 9 is a vertical cross-sectional view showing a conventional fixing jig.

In a seventh embodiment illustrated in FIG. 8, the flange portion 13e is integrally formed in the outer peripheral portion of the first clamping member 13. A clamping bolt 15c for pressing the workpiece W upwardly toward the clamping bolts 15 and 15a is provided at the flange portion 13e. In this embodiment, the clamping bolts 15 and 15a on the flange portion 14b side may be omitted, and the workpiece W may be pressed onto the lower face of the flange portion 14b.

Further, the number of the screw holes 14e may be appropriately increased or decreased, and fixing positions of the workpiece W may be increased or decreased.

The passages 11d, 13c and 14d may be omitted.

In each of the foregoing embodiments, the base member 11, the first clamping member 13 and the second clamping member 14 or the like are supported on the horizontal upper face 12a of the table 12. However, the jig according to each embodiment may be attached laterally to the inclined face or the face extending in the vertical direction.

INDUSTRIAL APPLICABILITY

As described above, according to the present invention, manufacturing and assembling can be facilitated with the reduced number of components.

What is claimed is:

1. A jig for positioning and fixing workpieces to a workbench, said jig comprising:

a first clamping member having a screw hole extending in the vertical direction;

a second clamping member, wherein the second clamping member has an insertion hole extending in the vertical direction and a male screw portion screwed into a screw hole of said first clamping member so as to be capable of adjusting a position, and wherein the second clamping member includes a flange portion at a periphery of the upper portion thereof;

a fixing member, wherein the fixing member pierces said screw hole of said first clamping member and said insertion hole of said second clamping member and fixes said first and second clamping members to said workbench; and a plurality of fastening members, wherein each fastening member determines a position of said workpieces with respect to said workbench by utilizing said first and second clamping members fixed to said workbench by said fixing member, and wherein each fastening member fixes said workpieces moved to a space between a clamping face of said first clamping member and said flange portion of said second clamping member.

2. The jig according to claim 1, wherein a base member including a male screw portion, a flange portion and an insertion hole is further provided, wherein said male screw portion of said base member is screwed into the lower portion of said screw hole of said first clamping member, wherein said flange portion of said base member is mounted on said workbench, and wherein said fixing member is inserted into said insertion hole of said base member.

3. The jig according to claim 1, wherein said fixing member includes a fixing bolt and a nut, wherein said fixing bolt is engaged and fixed to said workbench at a head portion thereof and inserted into said insertion hole of said second clamping member at a shaft portion thereof, and wherein said nut is screwed into the distal end of said fixing bolt.

4. The jig according to claim 1, wherein a concave portion having a diameter larger than that of said insertion hole is formed in said second clamping member, wherein said fixing member includes a fixing bolt and a nut, wherein a shaft portion of said fixing bolt is inserted into said insertion hole of said second clamping member, wherein said fixing bolt is engaged and fixed to said workbench at the lower end of a shaft portion thereof by said nut, and wherein a head portion of said fixing bolt is accommodated in said concave portion.

5. The jig according to claim 1, wherein each fastening member is a clamping bolt screwed downwardly into a screw hole formed in said flange portion of said second clamping member.

6. The jig according to claim 1, wherein passages along which said fixing member is inserted or removed from a side portion are respectively formed in said first and second clamping members.

7. The jig according to claim 2, wherein passages along which said fixing member is inserted or removed from a side portion are respectively formed in said base member, said first clamping member, and said second clamping member.

8. The jig according to claim 1, wherein said flange portion of said second clamping member is caused to protrude in the side direction away from the outer peripheral face of said first clamping member, and wherein a fastening member for fixing said workpiece supported on said workbench is provided at a protrusion portion of said flange portion.

9. The jig according to claim 1, wherein the lower end of said male screw portion of said second clamping member is supported on the upper face of said workbench, and wherein said first clamping member is screwed into an intermediate portion of said male screw portion so as to be capable of adjusting the position.

10. The jig according to claim 9, wherein said base member supported on said upper face of said workbench is screwed into the lower end portion of said male screw portion of said second clamping member.

11. The jig according to claim 1, wherein a fastening member which presses said workpiece upwardly is provided at said first clamping member.

12. The jig according to claim 1, wherein a height adjustment bolt is screwed into said first clamping member so as to be capable of adjusting the position, and wherein a protruding height of said height adjustment bolt from said clamping face can be adjusted.

13. The jig according to claim 5, wherein said first clamping member is directly in contact with said upper face of said workbench.

* * * * *